United States Patent

Sant Pont et al.

[11] Patent Number: 5,244,176
[45] Date of Patent: Sep. 14, 1993

[54] FLEXIBLE SUPPORT BAR

[76] Inventors: Jose M. Sant Pont, C. Maria Ouxiliadora, 25; Ramon Bigas Balcells, C. Canet, 24, both of 08017 Barcelona, Spain

[21] Appl. No.: 871,987

[22] Filed: Apr. 22, 1992

[30] Foreign Application Priority Data

Apr. 22, 1991 [ES] Spain .................................. 9101016

[51] Int. Cl.$^5$ .............................................. E04G 3/00
[52] U.S. Cl. .................................................. 248/284
[58] Field of Search ............... 248/276, 284, 278, 291, 248/289.1

[56] References Cited

U.S. PATENT DOCUMENTS 936,379  10/1909  Stevens ........................... 248/276 X
2,440,873  5/1948  Popp et al. .......................... 248/276
4,568,051  2/1986  Rosengren ...................... 248/278 X Primary Examiner—David M. Purol
Attorney, Agent, or Firm—Steinberg & Raskin

[57] ABSTRACT

The present invention comprises a core 1 formed by rigid sections 2 which alternate with flexible sections 3, supplied with flexible strips 4, 4a, 7, 7a, which tend to recover their position when bent transversally along either of their larger faces. The bar also incorporates a covering formed by a layer of plastic material 9, two tapes 10 and 11, which are wrapped firmly around it, and which produce friction between the strips and the opposing faces of the core 1. The bar bends transversally at the regions occupied by the flexible sections 3. The presence of rigid sections 2 gives greater resistance to the bar, while the two tapes 10, 11 provide the friction between the strips 4, 4a, 7, 7a necessary to keep stable the bends produced in the bar.

11 Claims, 3 Drawing Sheets

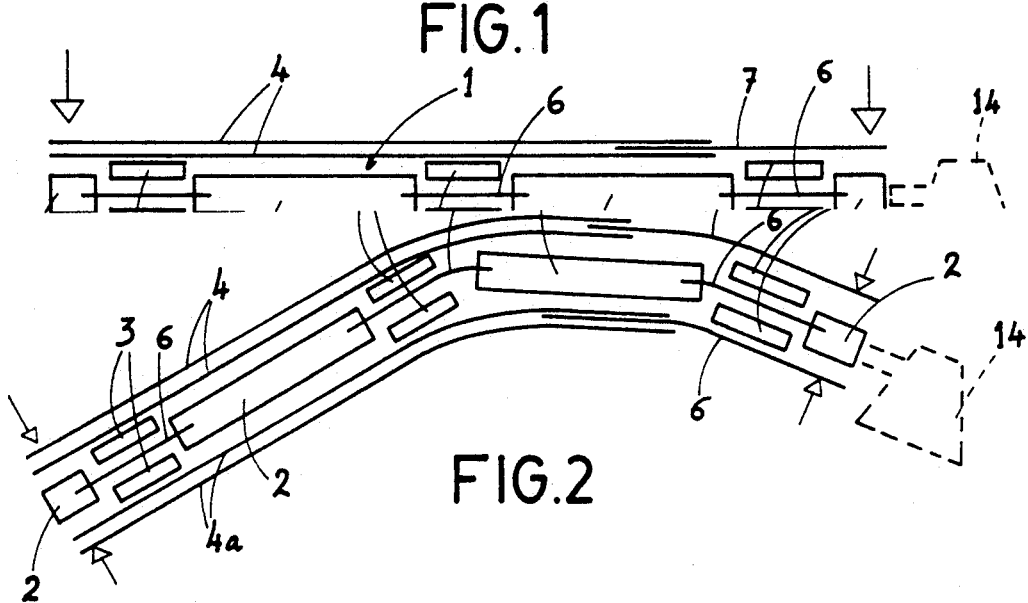
FIG.1
FIG.2
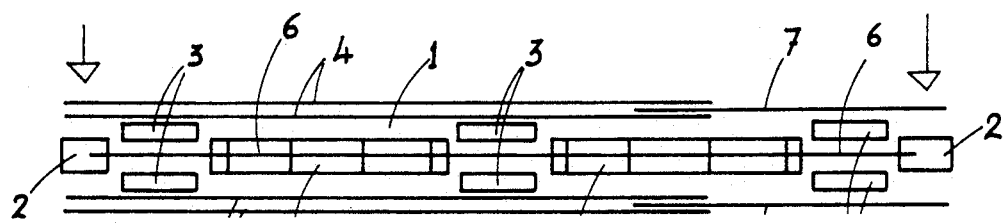

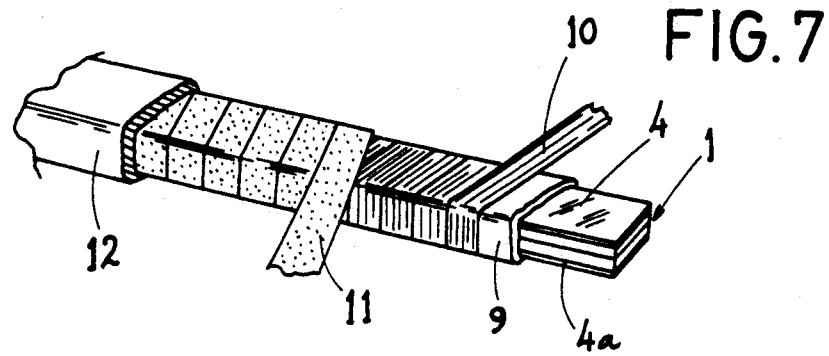
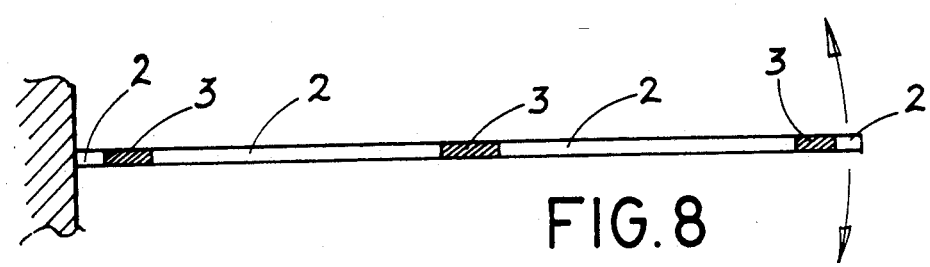
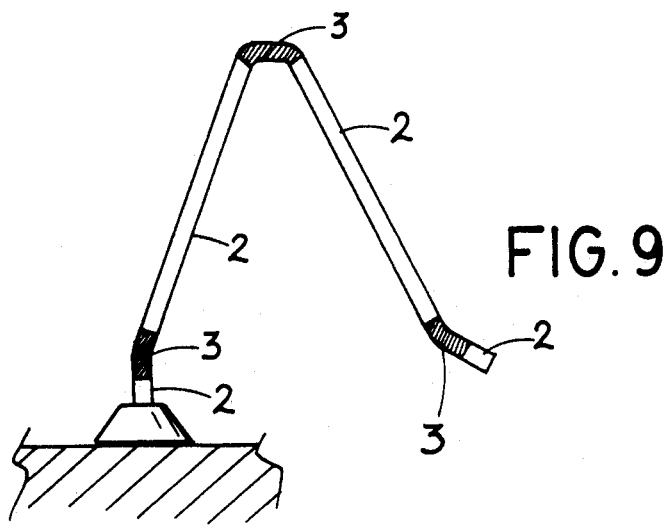
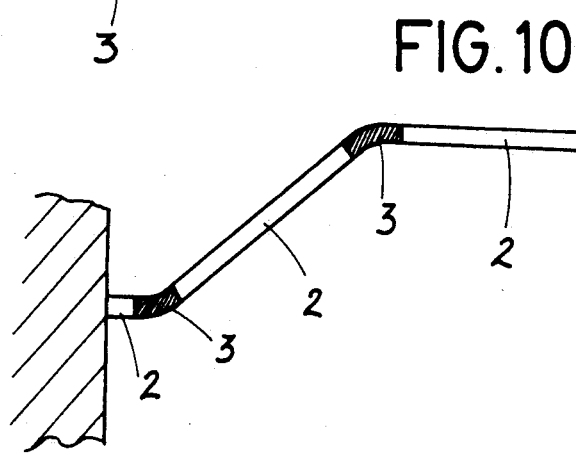

FLEXIBLE SUPPORT BAR

The present invention refers to a flexible support bar capable of maintaining various stable positions and even supporting a given weight or force without changing its position.

BACKGROUND OF THE INVENTION

The applicant of the present patent is at the same time titleholder of the spanish utility model No. 289,848 and patents Nos. 8803635 and 8902872.

The above mentioned documents refer to various support bars which the applicant of the present invention has been developing. The utility model No. 289,848 specifies the constitution of a support bar formed by multiple thin, flat strips, contiguous and packed together, attached to each other at one of their ends, and having the property of transverse elasticity due to which they tend to recover their initial position when submitted to a force at right angles to their larger face. Strips are strapped together by means of one or more flexible wrapping ties which keep them firmly juxtaposed one to another in order that, should the bar bend across one of its larger faces, a displacement under friction occurs between the thin strips, which displacement allows the bending and/or arching of the bar whilst braking and hindering its spontaneous return to its initial position.

The patent No. 8803635 refers to a support bar formed from a chain whose links, articulated one with another, are positioned between two flexible longitudinal strips, provided in trasversal direction with elasticity which tends to return them to their initial position when submitted to a force at right angles to their larger faces. The strips are firmly held to the two opposing faces of the link chain by means of a layer, or covering, of plastic material applied around the chain, and by a flexible and resistant tape, with a high degree of longitudinal rigidity, which is then applied to the covering, or layer, described above with the objective that, should a force be applied along a line more or less at right angles to the larger faces of the strips, the bar will bend and hold itself stable in this position without returning spontaneously to its initial position. The bar is subsequently given an external covering as embellishment.

The patent No. 8902872 describes a support bar formed by a prismatic rod which consists of rigid sections which alternate with flexible sections which are achieved by a plurality of deep transverse depressions. This rod is positioned between two longitudinally flexible strips which tend to recover their initial position on being subjected to a force at right angles to their larger faces according to characteristics already defined in patent No. 8803635. The above described assembly, in like manner to the bar described in the aforementioned patent No. 8803635, is enclosed in a wrapping which consists of an inner layer of plastic material and a flexible, resistant, tape having a high degree of longitudinal rigidity in order to allow the bending and/or arching of the bar in the previously described flexible regions.

Experience has shown that the practical embodiment of the object of the cited patents presents a number of drawbacks. For example the support bar which is the object of utility model No. 289,848 does not have sufficient flexibility and recuperative capacity to ensure the movement which it may undergo during its use.

The use of a flexible, resistant and longitudinally rigid tape, wrapped around the bar core, as with the bars which are the object of the patents Nos. 8803635 and 8902872, does not resolve this problem since in this case the strip loses the capacity to keep its stable position after a certain number of flexions of the bar, and yields when a given force or weight is applied to it.

If the pressure with which the tape is wrapped around the bar core is increased the frictional force created between the flexible strips becomes excessive to the point that such strips may break after a limited number of flexions of the bar.

In the case of the version of the bar which is the object of the patent No. 8902872 the flexible regions of the bar, formed by deep depressions, break after the bar has been subjected to flexion movements for some time.

DESCRIPTION OF THE INVENTION

The flexible support bar which is the object of the present invention has been devised in order to resolve the above mentioned drawbacks.

The said bar is of the type which comprise a core formed by rigid sections which alternate with flexible sections, which allow the bending and/or arching of the bar at the flexible sections, said core being arranged between two longitudinal flexible strips which have one of their ends attached to one of the ends of the bar core. The longitudinal strips tend to recover their position when subjected to a force at right angles to their larger faces, the assembly of strips and bar core being enclosed in a wrapping which comprises an inner layer of plastic or like material, and a flexible and resistant tape, possessing a high degree of longitudinal rigidity, which is wrapped around the assembly formed by the bar core, the longitudinal strips and the inner layer of plastic material, said strips remaining firmly juxtaposed to the core. The wrapping further comprises a flexible embellishment covering which externally encloses the bar, which can bend or arch at the flexible sections of the core and keep stable its adopted position due to the friction between the flexible longitudinal strips and the bar core.

Starting from this known embodiment the flexible support bar is essentially characterized in that the flexible sections of the bar core are formed by flexible and preferably elastic blocks, in whose interior is arranged at least one flexible and transversally elastic strip which tends to recover its position when a force is applied at right angles to its larger faces, the strip being also joined to the rigid sections of the bar core.

The rigid sections of the bar core are formed by pairs of plates, juxtaposed and joined together, whose ends are joined to the ends of the flexible blocks and to the ends of the flexible and transversally elastic strips arranged within the blocks.

A continuous, flexible and transversally elastic strip may cross the flexible blocks, passing between the pairs of plates which constitute the rigid sections of the core.

The two ends of the bar core are composed of rigid sections to which are joined the ends of at least two pairs of strips, each pair being oriented in the opposite direction to the other. The strips of each pair are, at least partially, juxtaposed in such a way that when the bar bends at one of the flexible sections the strips of one of the pairs experience a displacement under friction in the opposite direction to the displacement produced in the strips of the other pair.

More specifically it is envisaged that two pairs of flexible strips are attached at one end of the bar core, the constituent strips of each pair being juxtaposed one with the other, and the two pairs being applied to two opposing faces of the core. At the other end of the bar core two strips with the same characteristics as those aforementioned are attached, applied, respectively, to the two opposing faces of the core and partially juxtaposed to the strips of each pair mentioned in the first place.

Over the flexible, resistant tape, possessing a high degree of longitudinal rigidity, which is wrapped firmly around the covering of plastic material which encloses the bar core, there is firmly wrapped at least a second flexible, longitudinally elastic tape.

Between the flexible, transversally elastic, strips there is a layer of lubricating and antirust material.

BRIEF DESCRIPTION OF THE DRAWINGS

The present description is accompanied by a number of drawings which serve as an aid to its understanding and which, with the sole status of example, represent a practical embodiment of the flexible support bar.

FIG. 1 is a schematic view in longitudinal section of a bar core in accordance with the present invention having strips juxtaposed on two of the opposing faces of the bar core when in a straight position.

FIG. 2 is a similar view of the embodiment illustrated in FIG. 1 showing the bar in accordance with the present invention in a bent position.

FIG. 3 is a view similar to FIG. 1 wherein a continuous strip has been substituted for the fragmented strips arranged within the flexible sections.

FIG. 7 is a perspective view showing a section of the bar partially enclosed by tape.

FIG. 8 is a schematic elevational side view of a first possible position of the bar in accordance with the invention.

FIG. 9 is a schematic elevational side view of a second possible position of the bar in accordance with the invention.

FIG. 10 is a schematic elevational side view of a third possible position of the bar in accordance with the invention.

DESCRIPTION OF A PREFERRED EMBODIMENT

Figure 4:
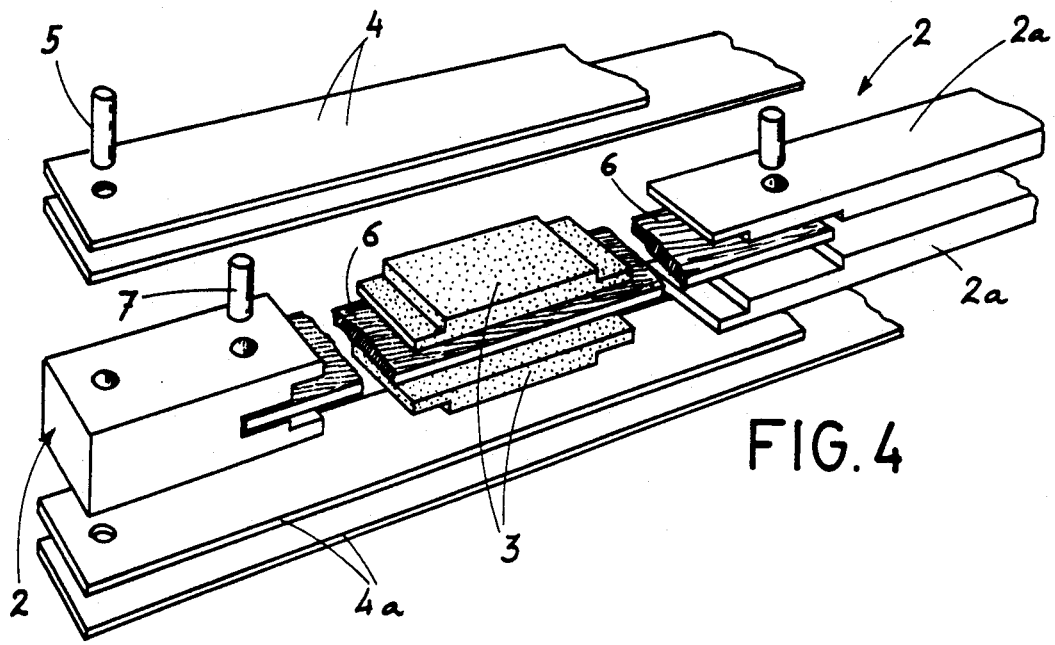
FIG. 4 is a more detailed perspective of the components of the bar core and a portion of the flexible strips in accordance with the invention.
Figure 5:
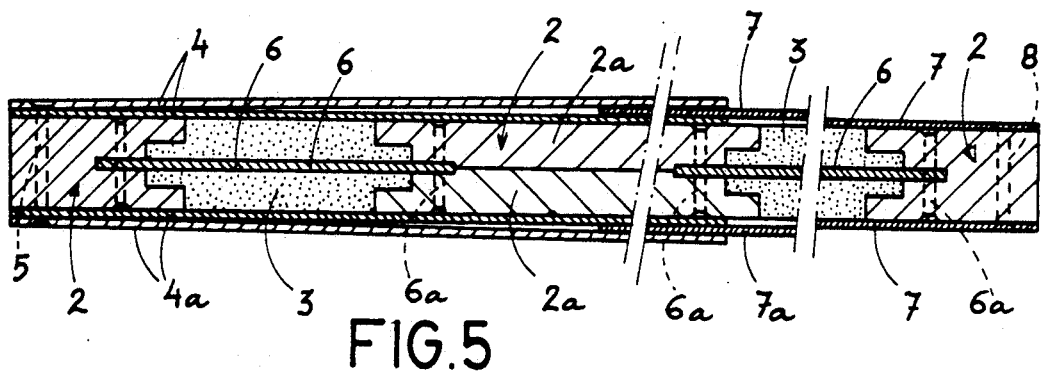
FIG. 5 is a detail in longitudinal section of the components shown in FIG. 4 after assembly.

The flexible support bar shown in the drawings comprises a core of general reference 7, formed by rigid sections 2 alternating with flexible sections 3 (FIGS. 1 and 2). Alongside the opposing faces of the core 1 there are mounted two pairs of strips 4, 4a, juxtaposed one to the other and subjected at one of their ends to one of the end sections 2 of the core by means of rivets 5 or other similar attachment devices FIG. 5. The strips 4, 4a are flexible and transversally elastic in such a way that they can bend or curve when a transverse force is applied to them substantially at right angles to any of their larger faces and that they tend to recover their original position on cessation of the force.

The rigid sections are advantageously formed by pairs of plates 2a, between whose ends are joined the ends of strips 6 whose characteristics are similar to those of the strips 4, 4a, i.e. they are flexible and transversally elastic. The strips 6 are placed longitudinally within the flexible sections or blocks 3 which are formed by blocks of flexible and preferably elastic material, for example an elastomer, whose ends fit inside the ends of the plates 2, 2a all the above components being fixed by means of rivets 5 or similar attachment devices.

Although in the example illustrated in the drawings the strips 6' are formed by successive sections, the possibility has been envisaged that they may be formed by one single continuous strip which runs within the core 1' passing through the blocks -3- and the rigid sections -2-(FIG. 3). In other respects, the embodiment illustrated in FIG. 3 is similar to the embodiment illustrated in FIGS. 1 and 2.

At the end of the core 1, 1' opposite to that to which the strips 4, 4a are attached, there are attached two strips 7, 7a, by their ends, and by means of a rivet 8 or other similar device (FIG. 5), the characteristics of said strips being similar or identical to those of the strips 4, 4a, i.e. flexible and transversally elastic, capable of bending when a force is applied at right angles to one of their larger faces, and tending to recover their original position on cessation of the force.

The strips 7, 7a are juxtaposed along the same faces of the core 1 as the strips 4, 4a and their free ends are arranged between the strips 4 and 4a of each pair. A lubricating and antirust product is applied between these described strips.

The core 1 with the strips 4, 4a, 7, 7a, is covered with a layer 9 which is fitted tightly around it. This layer may be of a plastic material and is of the type known in previous embodiments (FIG. 7).

Around the layer 9 there is firmly wrapped a tape 10, again of the known type, which is resistant, flexible, and has a high degree of longitudinal rigidity.

Over this tape there is firmly wrapped a second tape 11, also resistant, flexible and having a high degree of longitudinal rigidity, which constitutes one of the innovations in the bar which is the object of the invention (FIG. 7).

Figure 6:
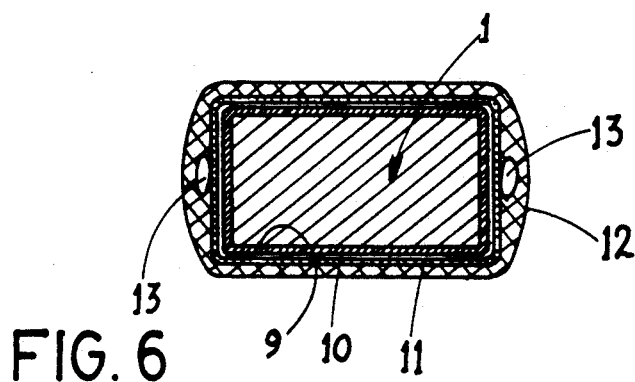
FIG. 6 is a transverse section view of the bar across a plane which cuts through one of the rigid sections.

Finally the whole bar assembly is enclosed by a tubular covering 12, flexible, optionally elastic, providing embellishment, and in whose interior there may be located electrical conducting wires 13 (FIG. 6).

In like manner to the previous embodiments, although with new components in the wrapping and in the bar core, the tapes 10 and 11 create an encircling force or pressure, which keeps the flexible strips 4, 4a, 7, 7a firmly applied one to another and to the two opposing faces of the core 1, 1' which is formed by the rigid sections 2 and the flexible sections 3.

Due to this, when a force is applied at right angles to the faces of the bar in which the flexible strips 4, 4a, 7 and 7a are located, the bar may bend or curve at any of the regions occupied by the flexible section or blocks 3 (FIGS. 9 and 10) with the result that there occurs a displacement under friction of the strips 4, 4a in a direction opposite to that of the displacement produced in the strips 7, 7a, bearing in mind that the displacement produced in the strips located in the smaller radius of the curve which the elbow or articulation block, i.e. flexible sections or blocks 3, adopts will be greater than that which occurs in the strips which occupy the larger radius. The friction obtained between the strips 4, 4a, 7, 7a and the core 1 ensures the stability of any bar position, even to the extent of allowing the incorporation of a conventional object such as, for example, a lamp 14 at one of its ends. In this context the combined action of the two wrapping tapes 10 and 11, which unites the longitudinal rigidity of the former with the elasticity of the latter, is vital for the effective operation of the bar.

It is important to emphasize the role of the articulation blocks i.e. flexible sections or blocks 3, with the internal reinforcement of the flexible strips 6, 6', which enable the bar to be provided of as many articulation points, or elbows, as there are blocks incorporated in the core 1. The presence of the two groups of strips, 4, 4a, and 7, 7a, oriented in opposing directions, confers on the bar an extraordinary mobility and capacity for orientation, not only in the intermediary sections, but also in its end sections.

The presence of the elastically flexible blocks 3 interspersed with the rigid sections 2 instead of the weakened regions of the single integral bar, produces in the bar an increased resistance and flexion capacity in comparison with earlier embodiments, there no longer being weakened regions since the blocks are now reinforced by the strips 6.

In virtue of the elastic tape 11 wrapped round the tape 10 having a high degree of longitudinal rigidity, the pressure on the strips 4, 4a, 7, 7a increases and so does the friction between the components, but at the same time the bar core obtains a greater elasticity and recovering capacity, in such a way that it keeps its capacity for sustaining a weight even when the bar is subjected to multiple flexion movements.

Due to the increase in the resistance of the bar which results from the presence of the tape 11 it is possible to reduce the thickness of the strips which compose the bar core, which thus acquires a slimmer and more decorative character which in no way reduces the resistance necessary to support a certain weight without bending, independently of the number of times the bar is bent.

Finally the presence of a lubricating and antirust product between the strips 4, 4a, 7, and 7a and -7a- smoothes the articulation movements of the bar and protects its internal components.

Although FIGS. 1 and 2 of the drawings represent a case where the bar functions as a support for an orientable lamp, it is clear that the said bar can have any other application as a component in a structure of variable form and position.

The materials employed in the fabrication of the components of the bar remain independent of the object of the invention, as do the forms and dimensions of the same and all accessory details which may present themselves, always and only insofar as they do not effect the essence of the invention.

We claim:

1. A flexible support bar comprising
   a core having flexible sections and rigid sections, said rigid sections alternating with said flexible sections such that said bar bends and arches in proximity to said flexible sections,
   each of said flexible sections comprising a flexible and elastic block having at least one flexible and transversely elastic strip arranged therein, said elastic strip being attached to said rigid sections in said core and having a first face which is larger than a second face, said elastic strip being structured and arranged to return to an initial position after a force is applied in a direction perpendicular to said first face,
   a pair of flexible strips arranged on opposite sides of said core and contacting said core, each of said pair of strips having a first end attached to an end of said core and a first face which is larger than a second face and, said pair of strips being structured and arranged to return to an initial position after a force is applied in a direction perpendicular to said first face, said pair of strips and said core causing friction therebetween such that said bar bends or arches in proximity to said flexible sections to a second position and maintains said second position, and
   a wrapping enclosing said core and said pair of strips, said wrapping comprising a first flexible and resistant tape arranged around an inner layer of plastic, and a tubular covering arranged around said first tape, said first tape being rigid in a longitudinal direction.

2. The bar of claim 1, further comprising attachment means to connect said pair of strips to said core.

3. The bar of claim 2, wherein said attachment means comprise rivets arranged to pass through holes formed in said pair of strips and said core.

4. The bar of claim 1, wherein said rigid sections comprise a pair of plates arranged adjacent to and attached to one another, said pair of plates having ends attached to both said flexible blocks and said elastic strip arranged within said flexible blocks.

5. The bar of claim 1, wherein said elastic strip comprises a continuous, flexible and transversely elastic strip which extends through said flexible blocks and said rigid sections.

6. The bar of claim 4, wherein said elastic strip comprises a continuous, flexible and transversely elastic strip which extends through said flexible blocks and between a first one of said pair of plates and a second one of said pair of plates.

7. The bar of claim 1, wherein rigid sections are arranged at a first and second end of said bar, further comprising at least two pair of flexible strips, a first pair of said at least two pairs being connected at said first end of said bar and a second pair of said at least two pairs being connected at said second end of said bar, the flexible strips of said first pair partially overlapping the flexible strips of said second pair such that said first pair is displaceable under friction in a direction opposite to a direction of displacement of said second pair when said bar bends in proximity to said flexible sections.

8. The bar of claim 1, further comprising two pair of flexible strips attached to said core at a first end of said bar, a first pair of said two pair of flexible strips being attached to one side of said core and said second pair of said two pair of flexible strips being attached to an opposite side of said core, and
   an additional pair of flexible strips attached at a second end of said core opposite said first end of said bar, a first strip of said additional pair of strips being attached to one side of said core and a second strip of said additional pair of strips being attached to an opposite side of said core, said additional pair of flexible strips partially overlapping said two pair of flexible strips.

9. The bar of claim 8, wherein rigid sections are arranged at said first and second ends of said bar.

10. The bar of claim 1, further comprising an additional flexible and elastic tape firmly wrapped over said first tape.

11. The bar of claim 1, further comprising a layer of lubricating and anti-rust material arranged between said pair of strips.

* * * * *